E. J. & J. R. RICHARDSON.
SELF ADJUSTING DRIVING BELT.
APPLICATION FILED MAY 12, 1916.
1,215,196.
Patented Feb. 6, 1917.
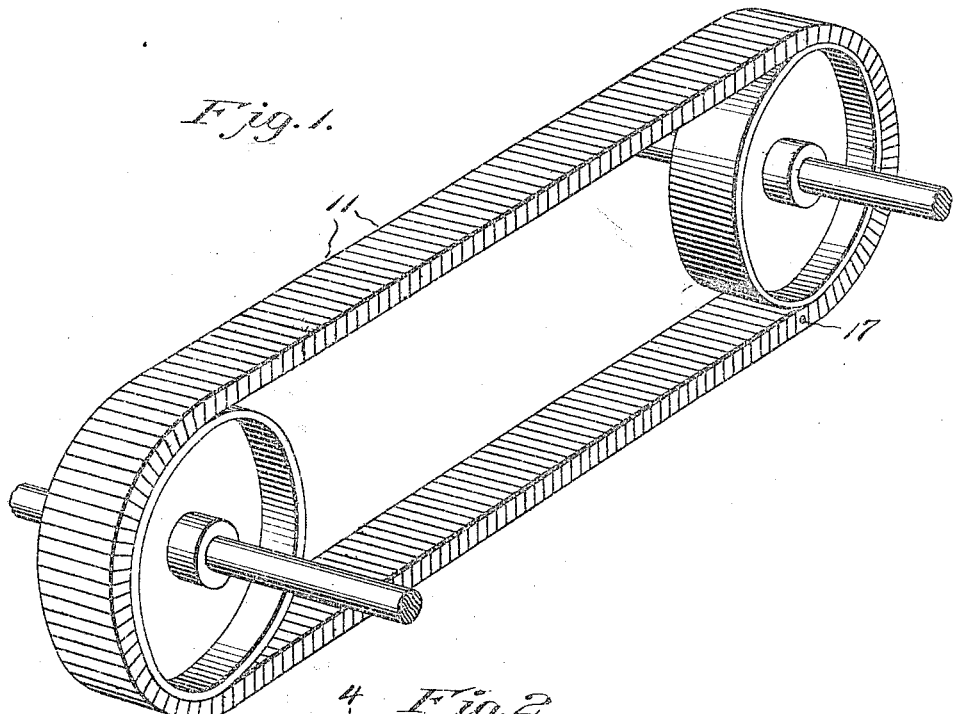
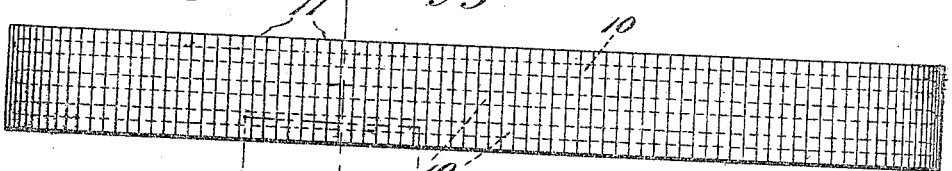
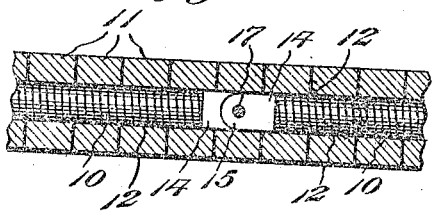
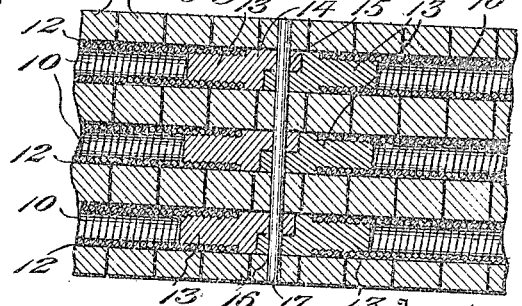
Witnesses
Edwin F. McKee
[signature]
Inventors
E. J. Richardson
& J. R. Richardson
By Victor J. Evans
Attorney

UNITED STATES PATENT OFFICE.

EDWARD J. RICHARDSON AND JAMES ROY RICHARDSON, OF CHAMBERLAIN, SOUTH DAKOTA, ASSIGNORS OF ONE-THIRD TO GEORGE R. WARNER, OF CHAMBERLAIN, SOUTH DAKOTA.

SELF-ADJUSTING DRIVING-BELT.

1,215,196.  Specification of Letters Patent.  Patented Feb. 6, 1917.

Application filed May 12, 1916. Serial No. 97,142.

*To all whom it may concern:*

Be it known that we, EDWARD J. RICHARDSON and JAMES ROY RICHARDSON, citizens of the United States, residing at Chamberlain, in the county of Brule and State of South Dakota, have invented new and useful Improvements in Self-Adjusting Driving-Belts, of which the following is a specification.

This invention deals with belts and has particular reference to power transmitting belts such as are used in connection with machinery.

The primary object of the invention resides in the provision of an elastic belt of the above mentioned character, capable of adjusting itself to the pulleys or surface over which it passes, with a view of preventing vibration of the different runs of the belt, and thereby eliminating noise and all possibility of the belt jumping a pulley.

Another important object of the invention resides in the novel means of fastening the adjacent ends of the belt together.

The nature and advantages of the invention will be better understood from the following description when taken in connection with the accompanying drawing, the invention residing in the construction, combination and arrangement of parts as claimed.

In the drawing forming part of this specification like numerals of reference indicate similar parts in the several views and wherein:—

Figure 1 is a perspective view of the belt when used.

Fig. 2 is a top plan view.

Fig. 3 is an enlarged vertical sectional view taken on line 3—3 of Fig. 2.

Fig. 4 is an enlarged horizontal sectional view taken on line 4—4 of Fig. 2.

As shown in this particular instance, the device forming the subject matter of our invention comprises a plurality of spaced parallel coil springs 10 having their convolutions normally arranged in contacting engagement, while mounted upon the springs are a plurality of leather strips 11. These strips are arranged transversely of the springs 10 and are provided with openings 12 for the reception of the springs, the strips 11 being closely associated, or in other words arranged in face to face contact. It might here be stated that one or more springs 10 may be employed, the number of springs depending upon the desired width of the belt.

The ends of the belt as a unit can be secured together in various ways, use being preferably made of threaded pins 13 each having a head 14 provided with a reduced longitudinal extension 15. These pins are used in pairs, one being associated with each end of one of the springs 10, having their shanks 13 threaded within the convolutions of the spring, with the heads 14 projecting therefrom to permit of the extensions 15 being disposed in overlapped relation. The extensions 15 of course are provided with openings 16 adapted to register when two of the fastening elements are operatively associated for the reception of a cotter pin 17 which latter is adapted to also pass transversely through the particular leather strip 11 which receives the overlapped extensions 15. The pin 17 of course holds the ends of the belt together, the construction providing a flexible coupling for the latter. Manifestly we have provided a belt of the class in question which by reason of its elasticity is capable of adjusting itself to the pulleys A over which it is trained, the belt possessing the proper tension to permit the belt to pass noiselessly over the pulleys without vibrating, thereby eliminating to a large degree the possibility of the belt leaving one or both of the pulleys. When the belt is used in connection with flanged pulleys the belt can be stretched to permit the same to be trained over the same without uncoupling the adjacent ends of the belt.

While it is believed that from the foregoing description the nature and advantages of the invention will be apparent, we desire to have it understood that what is herein shown and described is merely illustrative of one embodiment of the invention to which we do not limit ourselves, and that such changes may be resorted to when desired as fall within the scope of what is claimed.

What is claimed is:—

A belt of the character described comprising a plurality of springs, a plurality of leather strips arranged in face to face contact, and having alined openings to receive said springs, a pin threaded in each end of the springs and having a head formed with a reduced apertured extension, the extensions on the heads of the adjacent ends of each spring being overlapped, the extensions of all of said springs being disposed in alinement and having their apertures in alinement, and a rod extended through one of the leather strips embracing said extensions, and also through the apertures in the extensions of all of said springs, whereby a flexible coupling is provided for the adjacent ends of the belt.

In testimony whereof we affix our signatures.

EDWARD J. RICHARDSON.
JAMES ROY RICHARDSON.

Witnesses:
GEO. R. WARNER,
CHESTER S. LOCKWOOD.